3,330,823
N-AMINO-LOWERALKYLENE-BENZO-LACTAMS

Jack Bernstein, New Brunswick, Edward J. Pribyl, Metuchen, and John Krapcho, Somerset, N.J., assignors, by mesne assignments, to E. R. Squibb & Sons, Inc., New York, N.Y., a corporation of Delaware
No Drawing. Filed Dec. 16, 1964, Ser. No. 418,910
15 Claims. (Cl. 260—239.3)

This invention relates to new compounds of the formula (I)
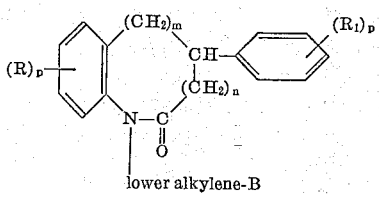
lower alkylene-B and to acid addition and quaternary ammonium salts thereof.

The symbol $m$ in Formula I represents 1 or 2, $n$ represents 0 or 1 and $p$ represents 1, 2 or 3. R and $R_1$ in Formula I each represents hydrogen, halogen, lower alkyl, trihalomethyl or lower alkoxy. All four halogens are within the scope of R and $R_1$, but chlorine and bromine are preferred as the ring attached halogens and trifluoromethyl is the preferred trihalomethyl group. The lower alkyl groups represented by R and $R_1$ and the lower alkyl groups which are part of the lower alkoxy substituents represented by R and $R_1$, as well as the lower alkylene groups, are straight or branched chain aliphatic hydrocarbon radicals having less than eight carbon atoms, including, for example, methyl, ethyl, propyl, isopropyl, butyl, isobutyl, t-butyl, amyl, hexyl and the like. One to four carbon atom groups are preferred. As indicated, one to three substituents may be attached to either phenyl ring.

The symbol B represents a basic nitrogen containing radical of less than 12 carbon atoms which may be represented as (II)

or (III)
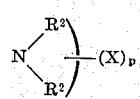

wherein each $R^2$ represents hydrogen, lower alkyl, hydroxy-lower alkyl, or phenyl-lower alkyl, forming with the nitrogen such basic groups as amino, lower alkylamino, e.g., methylamino, ethylamino, di(lower alkyl) amino, e.g., dimethylamino, diethylamino, dipropylamino, (hydroxy-lower alkyl)amino, e.g., hydroxyethylamino, di(hydroxy-lower alkyl)amino, e.g., di(hydroxyethyl) amino, phenyl- (lower alkyl)amino, e.g., benzylamino and phenethylamino, and N-(lower alkyl)-phenyl(lower alkyl)amino, e.g., N-methylbenzylamino and the like.

In addition the nitrogen may join with the groups represented by $R^2$ as in Formula III to form a 5 to 7-membered monocyclic heterocyclic containing, if desired, an oxygen, sulfur or an additional nitrogen atom (no more than two hetero atoms altogether). That is, the two symbols $R^2$ represent together tetramethylene, pentamethylene, hexamethylene, oxatetramethylene, oxapentamethylene, azatetramethylene, azapentamethylene, azahexamethylene, thiatetramethylene or thiapentamethylene. The heterocyclic group may also be substituted by one to three groups represented by X, $p$ being 1 to 3 as above. X represents hydrogen, halogen, lower alkyl, lower alkoxy, hydroxy, hydroxy-lower alkyl, lower alkanoyl, trihalomethyl, nitro, amino and dialkylamino.

Thus heterocyclic groups represented by B include, for example, piperidino, (lower alkyl)piperidino, e.g., methylpiperidino, di(lower alkyl)piperidino, e.g., dimethylpiperidino, (lower alkoxy)piperidino, e.g., methoxypiperidino, 2-, 3- or 4-piperidyl, 2-, 3- or 4-(N-lower alkylpiperidino), e.g., 2-, 3- or 4-(N-methylpiperidyl), pyrrolidino, (lower alkyl)pyrrolidino, e.g., methylpyrrolidino, di(lower alkyl)pyrrolidino, e.g., dimethylpyrrolidino, (lower alkoxy)pyrrolidino, e.g., ethoxypyrrolidino, 2- or 3-pyrrolidyl, 2- or 3-(N-lower alkylpyrrolidyl), e.g., 2- or 3-(N-methylpyrrolidyl), morpholino, (lower alkyl)morpholino, e.g., 3-methylmorpholino or 2-methylmorpholino, di(lower alkyl)- morpholino, e.g., 2, 3-dimethylmorpholino, (lower alkoxy)-morpholino, e.g., ethoxymorpholino, thiamorpholino, (lower alkyl)-thiamorpholino, e.g., 3-methylthiamorpholino or 2-methylthiamorpholino, di(lower alkylthiamorpholino, e.g., 2, 3-dimethylthiamorpholino, (lower alkoxy)thiamorpholino, e.g., 2-methoxythiamorpholino, piperazino, (lower alkyl)piperazino, e.g., $N^4$-methylpiperazino, 2-methylpiperazino or 3-methylpiperazino, $N^4$-hydroxy lower alkyl piperazino, e.g., $N^4$-hydroxyethyl piperazino, di(lower alkyl)piperazino, e.g., 2,3-dimethylpiperazino, 4-phenylpiperazino, 4-(phenyl-lower alkyl)piperazino, e.g., 4-(phenethyl)piperazino, 4-cinnamyl, hexamethyleneimino and homopiperazino.

Preferred are those compounds wherein $m$ is 1 or 2, especially 2, $n$ is 1, R and $R_1$ are both hydrogen and B is di(lower alkyl)amino, especially dimethylamino. The lower alkylene group preferably has three carbons.

The new bases of Formula I form acid addition salts by reaction with the common inorganic and organic acids. Such inorganic salts as the hydrohalides, e.g., hydrobromide, hydrochloride, and hydroiodide, sulfates, nitrates, phosphates, borates, etc., and organic salts as acetate, oxalate, tartrate, malate, citrate, succinate, benzoate, ascorbate, salicylate, theophyllinate, camphorsulfonate, alkanesulfonate, e.g., methanesulfonate, arylsulfonate, e.g., benzenesulfonate, toluenesulfonate and the like are also within the scope of the invention. It is frequently convenient to effect the purification of the product by forming the acid salt. The base may be obtained therefrom by neutralization with an alkali hydroxide such as sodium hydroxide.

The bases of Formula I also form quaternary ammonium salts, e.g., lower alkyl halides such as methyl chloride, methyl bromide, ethyl chloride, etc., lower alkyl sulfates such as methyl sulfate, ethyl sulfate, etc., monocyclic aryl(lower alkyl)halides and sulfates such as benzyl bromide, benzyl sulfate, etc. This is accomplished by reacting the base with the alkyl halide, sulfate, or the like.

The compounds of this invention are therapeutically active substances which possess hypotensive activity and inhibit the effects of Tremorine. They are useful in the treatment of conditions such as hypertension and Parkinsonism. They may be administered orally or parenterally in the form of tablets, capsules, elixirs, injectables or the like by incorporating the appropriate dosage of the base of Formula I or a physiologically acceptable acid addition salt or quaternary ammonium salt thereof in a conventional vehicle according to accepted pharmaceutical practice.

The new compounds of Formula I are produced by converting a cyclic ketone of Formula IV (IV) 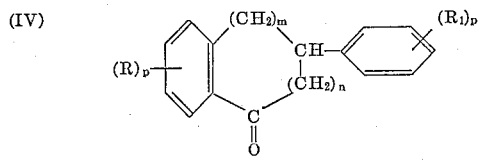

to compounds of Formula V by treatment with sodium azide in a medium such as acetic acid followed by concentrated sulfuric acid or by conversion of IV to an oxime and then rearranging the oxime to the desired compound of Formula V by a Beckmann rearrangement e.g., by treatment with an arylsulfonyl halide such as benzene-sulfonyl chloride in a hydrogen halide acceptor such as pyridine (V) 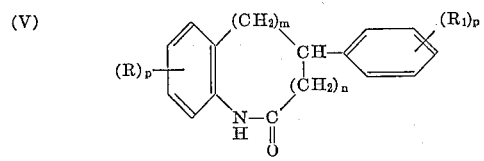

The lactam V is then reacted in an inert solvent, such as toluene, in the presence of a base such as sodamide, potassium butoxide or powdered sodium hydroxide, with a basic halide of Formula VI (VI)  hal-alkylene-B to yield the desired compounds of Formula I (hal being halogen, preferably chlorine or bromine).

When $m$ represents 1 and $n$ represents 0, the intermediate of Formula V may be produced by an alternate method which comprises reducing and cyclizing a compound of the formula (VII) 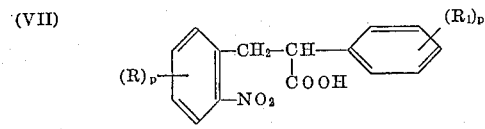

by treatment with hydrogen in the presence of a catalyst such as palladium-carbon.

In all formulas the symbols have the same meaning as in Formula I and hal represents halogen, preferably chlorine or bromine.

The following examples are illustrative of the invention, all temperatures being in degrees centigrade.

*Example 1.—1-(3-dimethylaminopropyl)-3,4,5,6-tetrahydro-4-phenyl-1-benzazocin-2(1H)-one, oxalic acid salt*

(a) *3,4,5,6 - tetrahydro - 4-phenyl-1-benzazocin-2(H)-one.*—To a solution of 11.8 g. of 6,7,8,9-tetrahydro-7-phenyl-5H-benzocyclohepten-5-one oxime [Bull. Soc. Scient. Bretagne, 26, 9 (1951)] in 90 ml. pyridine are added 9.2 g. benzenesulfonyl chloride. The solution is allowed to stand overnight and then diluted with 295 ml. of cold 4N hydrochloric acid. The precipitate is filtered and recrystallized from 80% ethanol to give 5.6 grams of material melting at 188–189°.

(b) *1 - (3-dimethylaminopropyl)-3,4,5,6-tetrahydro-4-phenyl-1-benzazocin-2(1H)-one, oxalic acid salt.*—To a stirred solution of 5.0 g. of 3,4,5,6-tetrahydro-4-phenyl-1-benzazocin-2(H)-one in 100 ml. of toluene are added 0.82 g. of sodamide. The solution is heated on the steam bath for one hour and cooled. A solution of 2.66 g. dimethylaminopropyl chloride in 20 ml. of toluene is added and the mixture is heated on the steam bath for five hours. After cooling, the mixture is shaken with 200 ml. of water. The toluene solution is separated and extracted with 100 ml. of 10% hydrochloric acid. The acid layer is made basic with potassium carbonate and extracted with 2 x 20 ml. of ether. The ether extracts are combined, washed with water, dried over magnesium sulfate, filtered and concentrated. The residual free base (5.8 g.) is dissolved in 300 ml. of ether and treated with 2 g. of oxalic acid in 30 ml. of ethanol. The solid is filtered and recrystallized from 500 ml. of butanone to give 4.5 g. of material melting at 160–161°.

*Example 2.—1-(2-dimethylaminoethyl)3,4,5,6-tetrahydro-4-phenyl-1-benzazocin-2(1H)-one, oxalic acid salt*

By substituting 2.68 g. of dimethylaminoethyl chloride in the procedure of Example 1(b) there are obtained the free base and then the salt melting at 200–201°.

*Example 3.—1-(3-piperidinopropyl)-3,4,5,6-tetrahydro-4-phenyl-1-benzazocin-2(1H)-one, oxalic acid salt*

Five grams of 3,4,5,6-tetrahydro-4-phenyl-1-benzazocin-2-(1H)-one, 0.82 g. sodium amide and 3.6 g. of 3-piperidinopropyl chloride are reacted as in Example 1(b) to give the free base and then the crystalline salt.

*Example 4.—1-(2-dimethylaminoethyl)-4,5-dihydro-3-phenyl-1H-1-benzazepin-2(3H)-one, hydrochloride*

(a) *4,5 - dihydro - 3 - phenyl-1H-1-benzazepin-2(3H)-one.*—A suspension of 25.0 g. of 3,4-dihydro-2-phenyl-1-(2H)-naphthalenone and 8.5 g. sodium azide in 120 ml. glacial acetic acid is stirred with cooling and treated rapidly with 16 ml. concentrated sulfuric acid. The temperature is allowed to rise to 50° and kept at that temperature for one-half hour. The mixture is cooled and poured into 900 ml. of 10% sodium carbonate solution. The solid is filtered and recrystallized from 280 ml. ethanol to give 12.7 g. of material melting at 195–196°.

(b) *1 - (2 - dimethylaminoethyl)-4,5-dihydro-3-phenyl - 1H-1-benzazepin-2(3H)-one hydrochloride.*—A solution of 5.93 g. of 4,5-dihydro-3-phenyl-1H-1-benzazepin-2(3H)-one and 1.02 g. sodium amide in 200 ml. of toluene is heated on the steam bath with stirring until the sodium salt starts to precipitate from the solution.

The mixture is cooled and 50 ml. of dimethylformamide is added to dissolve the sodium salt. A solution of 3.2 g. dimethyl-aminoethyl chloride in 30 ml. toluene is added and the mixture is stirred and heated on the steam bath for 5 hours. The mixture is filtered and the solvent is removed by heating in vacuo. The residue (10 g.) is dissolved in 100 ml. of 10% hydrochloric acid, the resulting solution is filtered, made alkaline and extracted with ether. The ether extract containing the free base is dried, filtered and treated with one equivalent of hydrogen chloride in ethanol. The solid is filtered and recrystallized from 150 ml. of acetonitrile to give 4.6 g. of hydrochloride melting at 241–242°.

*Example 5.—1 - (3 - dimethylaminopropyl)-4,5-dihydro-3-phenyl-1H-1-benzazepin-2(3H)-one hydrochloride*

By substituting 3.2 g. of 3-dimethylaminopropyl chloride in the procedure of Example 4(b) there are obtained the free base and then 4.0 g. of salt melting at 241–242°.

*Example 6.—1 - (3-morpholinopropyl) - 4,5 - dihydro-3-phenyl-1H-1-benzazepin-2(3H)-one hydrochloride*

By substituting 3.5 g. of 3-morpholinopropyl chloride in the procedure of Example 4(b) there is obtained a crystalline product.

*Example 7.—1 - (3-piperidinopropyl)-3,4,5,6-tetrahydro-4 - (o-chlorophenyl) - 1-benzazocin-2(1H)-one, oxalic acid salt*

(a) *3,4,5,6-tetrahydro - 4 - (o - chlorophenyl)-1-benzazocin-2(H) - one.*—6,7,8,9 - tetrahydro-7-(o-chlorophenyl)-5H-benzocyclohepten-5-one oxime [prepared according to the procedure described in Bull. Soc. Scient. Bretagne, 26, 9 (1951)] is reacted with benzene-sulfonyl chloride as described in Example 1(a) to give a crystalline material.

(b) *1 - (3 - piperidinopropyl)-3,4,5,6-tetrahydro-4-(o-chlorophenyl) - 1 - benzazocin - 2(1H)-one, oxalic acid salt.*—3,4,5,6 - tetrahydro - 4-(o-chlorophenyl)-1-benzazocin-2H-one is reacted with piperidinopropyl chloride in the manner described in Example 1(b) to give a crystalline material.

*Example 8.—1 - [2 - (1 - hexamethylenimino)ethyl]-3,4, 5,6 - tetrahydro - 4 - o-tolyl-1-benzazocin-2(1H)-one, oxalic acid salt*

(a) *3,4,5,6 - tetrahydro - 4 - o - tolyl - 1 - benzazocin-2(H)-one.*—6,7,8,9-tetrahydro - 7 - o - tolyl - 5H - benzocyclohepten-5-one oxime [prepared according to the procedure in Bull. Soc. Scient. Bretagne, 26, 9 (1951)] is reacted with benzenesulfonyl chloride as described in Example 1(a) to give a crystalline material.

(b) *1-[2-(1-hexamethylenimino)ethyl] - 3,4,5,6 - tetrahydro-4-o-tolyl - 1 - benzazocin - 2(1H) - one, oxalic acid salt.*—3,4,5,6 - tetrahydro - 4 - o - tolyl-1-benzazocin-2H-one is reacted with 2(1-hexamethylenimino)ethyl chloride in the manner described in Example 1(b) to give a crystalline material.

*Example 9.—1 - [3 - (4 - methylpiperazino)propyl]-4,5-dihydro - 3 - o - methoxyphenyl-1H-1-benzazepin-2-(3H)-one hydrochloride*

(a) *4,5 - dihydro - 3 - o - methoxyphenyl-1H-1-benzazepin-2(3H)-one.*—By substituting 3,4 - dihydro-2-o-methoxyphenyl-1-(2H)-naphthalenone in the procedure of Example 4 there is obtained a crystalline product.

(b) *1 - [3 - (4-methylpiperazino)propyl]-4,5-dihydro-3 - (o-methoxyphenyl) - 1H - benzazepin-2(3H)-one hydrochloride.*—By substituting 3-[1-(4-methylpiperazino)] propyl chloride in the procedure of Example 4(b) there is obtained a crystalline product.

*Example 10.—1 - (2 - diethylaminoethyl)-3,4,5,6-tetrahydro-8,9 - dimethoxy - 4-(p-methoxyphenyl)-1-benzazocin - 2(1H) - one, oxalic acid salt*

By replacing the 6,7,8,9-tetrahydro-7-phenyl-5H-benzocycloheptene - 5-one oxime with 2,3-dimethoxy-7-(p-methoxy)phenyl - 6,7,8,9 - tetrahydro-5H-benzocyclohepten-5-one oxime in the procedure of Example 1(a) and by replacing the dimethylaminopropyl chloride with diethylaminoethyl chloride in the procedure of Example 1(b) there is obtained 1-(2-diethylaminoethyl)-3,4,5,6-tetrahydro - 8,9 - dimethoxy-4(p-methoxyphenyl)-1-benzazocin-2(1H)-one, oxalic acid salt.

*Example 11.—1 - (2 - dimethylaminoethyl)-4,5-dihydro-7,8-dimethoxy - 3 - (p-methoxyphenyl) - 1H - 1 - benzazepin-2(3H)-one hydrochloride*

By replacing the 25.0 grams of 3,4-dihydro-2-phenyl-1(2H)-naphthalenone with 34.5 grams of 3,4-dihydro-6,7 - dimethoxy - 2 - (p-methoxyphenyl)-1(2H)-naphthalenone in Example 4, there is obtained 1-(2-dimethylaminoethyl) - 4,5 - dihydro-7,8-dimethoxy-3-(p-methoxyphenyl)-1H-1-benzazepin-2(3H)one hydrochloride.

*Example 12.—1-(2-dimethylaminoethyl)-4,5 - dihydro - 3-(p - methoxyphenyl) - 8 - methyl - 1H - 1 - benzazepin-2(3H)-one hydrochloride*

By replacing the 25.0 grams of 3,4-dihydro-2-phenyl-1(2H)-naphthalenone with 29.5 grams of 3,4-dihydro-2-(p-methoxyphenyl)-7 - methyl - 1(2H) - naphthalenone in Example 4, there is obtained 1-(2-dimethylaminoethyl)-4,5-dihydro-3-(p-methoxyphenyl)-8-methyl-1H-1 - benzazepin-2(3H)-one hydrochloride.

*Example 13.—1-(2-dimethylaminoethyl)-1,3,4,5-tetrahydro-4-phenyl-2H-1-benzazepin-2-one hydrochloride*

(a) *1,3,4,5-tetrahydro-4-phenyl-2H - 1 - benzazepin - 2-one.*—A suspension of 12.0 g. of 3,4-dihydro-3-phenyl-1-(2H)-naphthalenone (J. Chem. Soc., 1934, 1333), 4.8 g. of sodium azide in 40 ml. of glacial acetic acid is stirred, cooled in an ice-bath and treated dropwise with 8 ml. of conc. sulfuric acid. The temperature of the reaction rises spontaneously to 70°. The cooling bath is removed and the mixture is maintained at 50° for 30 min. The evolution of gas ceases at this point; the mixture is cooled to 30° and poured cautiously with stirring onto 500 ml. of cold 10% sodium carbonate solution. A semi-solid separates. The addition of ether (about 50 ml.) causes the material to become crystalline. The mixture is filtered to give 9.7 g. of solid, M.P. 137–139°. After crystallization from 45 ml. of acetonitrile, the colorless product weighs 7.8 g., M.P. 140–142°.

(b) *1(2-dimethylaminoethyl) - 1,3,4,5 - tetrahydro - 4-phenyl-2H-1-benzazepin-2-one hydrochloride.*—A suspension of 5.0 g. of the material from part (a) is added to a slurry of 0.85 g. of sodamide in 75 ml. of toluene. This mixture is stirred at room temperature for 15 min. and then heated on a steam bath for 15 min. After cooling the mixture to 30°, the mixture is treated with a solution of 3.7 g. of 2-dimethylaminoethyl bromide in 50 ml. of toluene and then refluxed for 5 hr. The mixture is cooled to room temperature and extracted with 25 ml. of water. The aqueous phase is discarded and the organic phase is extracted with a solution of 3.5 ml. of conc. hydrochloric acid in 50 ml. of water. The aqueous phase is made basic with a solution of 2.5 g. of sodium hydroxide in 10 ml. of water and the liberated base is extracted with several portions of ether. The ether phases are combined, dried over magnesium sulfate, filtered and the solvent evaporated to give 5.0 g. of base. The latter is dissolved in 20 ml. of ethanol, treated with 3.5 ml. of 5.9 N alcoholic hydrogen chloride, and diluted to 100 ml. of ether to give 5.1 g. of colorless product, M.P. 224–226°. After crystallization from 50 ml. of isopropyl alcohol, the colorless solid weighs 3.9 g., M.P. 227–229°.

*Example 14.—1-(3-dimethylaminopropyl)-1,3,4,5-tetrahydro-4-phenyl-2H-1-benzazepin-2-one hydrochloride*

5.0 g. of material from part (a) of Example 13 are reacted with 0.85 g. of sodamide and 4.0 g. of 3-dimethylaminopropyl bromide in toluene according to the procedure of Example 13(b) to give 5.0 g. of base. The latter then is converted to the hydrochloride salt, 5.0 g., M.P. 196–198°. After crystallization from 35 ml. of isopropyl alcohol, the colorless solid weighs 3.9 g., M.P. 197–199°.

*Example 15.—1-(2-dimethylaminoethyl)-1,3,4,5-tetrahydro-4-phenyl-2H-1-benzazepin-2-one methiodide*

A solution of 5.0 grams of the free base of 1-(2-dimethylaminoethyl)-1,3,4,5-tetrahydro-4 - phenyl - 2H - 1-benzazepin-2-one as prepared in Example 13(b) in 200 ml. of acetonitrile is treated with 5 grams of methyl iodide. The reaction mixture is allowed to stand at room temperature, and the solvent is removed under reduced pressure. The residue is triturated with anhydrous ether and crystallized from a mixture of ethanol and ether.

*Example 16.—1-(2-diethylaminoethyl)-3-phenyl-1,2,3,4-tetrahydro-2-quinolone, salt with oxalic acid*

(a) *o-Nitro-α-phenylcinnamic acid.*—24 g. (0.17 mol.) of tri-n-propylamine, 23 g. (0.17 mol.) of phenylacetic acid and 25 g. (0.165 mol.) of o-nitrobenzaldehyde are added in that other, with stirring, to 80 ml. (0.85 mol.) of acetic anhydride. The reaction temperature rises spontaneously to 50°, then slowly subsides. The solution is heated on a steam bath for 11 hours.

The mixture is diluted with 600 ml. of benzene, stirred and heated on a steam bath for 5 minutes with 100 ml. of 2N sodium hydroxide and then separated. The extraction is repeated with 100 ml. of 2N sodium hydroxide and three 100 ml. portions of N sodium hydroxide. The extracts are combined, cooled in ice and acidified with concentrated hydrochloric acid. A yellow solid precipitates. After cooling for two hours, the solid is washed with water and dried. The product, o-nitro-α-phenylcinnamic acid is recrystallized from 140 ml. of ethanol, M.P. 193–195°.

(b) *3-phenylhydrocarbostyril.*—26.5 g. of the product of part (a) are suspended in 200 ml. of ethanol and reduced in a Pan hydrogenator in the presence of 3 g. of 5% palladium-charcoal catalyst. The theoretical amount of hydrogen is absorbed in about ½ hour. After standing overnight in contact with hydrogen, the product, 3-phenyl-hydrocarbostyril, crystallizes out. Chloroform is added and the catalyst is filtered off. The solvents are distilled off. The white crystalline residue is dried and recrystallized from absolute ethanol, M.P. 170–172°.

(c) *1-(2-diethylaminoethyl)-3 - phenyl - 1,2,3,4 - tetra-hydro-2-quinolone, salt with oxalic acid.*—To a stirred suspension of 2.5 g. (0.064 mol.) of sodamide in 200 ml. of toluene are added 14 g. (0.063 mol.) of 3-phenyl-hydrocarbostylril followed by 150 ml. of toluene. After stirring and refluxing for one hour, the mixture is cooled to room temperature, treated with a solution of 9.5 g. (0.07 mol.) of 2-diethylaminoethyl chloride in 50 ml. of toluene, then refluxed for four more hours.

The mixture is filtered and the filtrate is washed with 50 ml. of water, extracted with a solution of 10 ml. of concentrated hydrochloric acid in 100 ml. of water. The acid extract is washed with ether and made basic with potassium carbonate. The liberated base is taken up with ether, dried over anhydrous magnesium sulfate and acidified with ethereal hydrogen chloride. The hydrochloride precipitates as a gum.

The hydrochloride is treated with potassium carbonate and the liberated base is dissolved in 50 ml. of isopropyl alcohol, poured into a warm solution of 7 g. of oxalic acid in 50 ml. of isopropyl alcohol and the solution is warmed for 5 minutes. After standing overnight, the solid product is collected, washed with ether, dried over phosphorus pentoxide and recrystallized from isopropyl alcohol, M.P. 132–134°.

*Example 17.—1-(2-dimethylaminoethyl)-3-(p-chlorophenyl)-1,2,3,4-tetrahydro-2-quinolone, salt with oxalic acid*

By replacing the phenylacetic acid with 3-p-chlorophenyl acetic acid in part (a) and the 2-diethylaminoethyl chloride with 2-dimethylaminoethyl chloride in part (c) and otherwise proceeding as described in Example 16, 1-(2-dimethylaminoethyl) - 3 - (p-chlorophenyl) - 1,2,3,4-tetrahydro-2-quinoline, salt with oxalic acid is obtained.

By substituting other benzocycloheptenone oximes bearing different substituents on either of the phenyl rings in the procedure of Example 1, otherwise substituted naphthalenone in the procedure of Example 4 and otherwise substituted hydrocarbostyrils in the procedure of Example 16, the corresponding substituted other benzazocinones, benzazepinones and quinolones, respectively, of this invention as defined by Formula I are obtained.

What is claimed is:

1. A compound selected from the group consisting of bases of the formula

[Structure with $(CH_2)_m$, $(R_1)_p$, $(R)_p$, $(CH_2)_n$, N–C=O, lower alkylene-B]

wherein $m$ is a member of the group consisting of 1 and 2, $n$ is a member of the group consisting of 0 and 1, $p$ is a member of the group consisting of 1, 2 and 3, R and $R_1$, each is a member of the group consisting of hydrogen, halogen, lower alkyl, trihalomethyl and lower alkoxy, B is a basic nitrogen containing radical of the group consisting of amino, lower alkylamino, di(lower alkyl)-amino, (hydroxy-lower alkyl)amino, di-(hydroxy-lower alkyl)amino, phenyl(lower alkyl)amino, N-(lower alkyl)-N-phenyl-(lower alkyl)amino, piperidino, (lower alkyl)-piperidino, di(lower alkyl)piperidino, (lower alkoxy)piperidino, pyrrolidino, (lower alkyl)pyrrolidino, di(lower alkyl)pyrrolidino, (lower alkoxy)pyrrolidino, morpholino, (lower alkyl)morpholino, di(lower alkyl)morpholino, (lower alkoxy)morpholino, thiamorpholino, (lower alkyl) thiamorpholino, di(lower alkyl)thiamorpholino, (lower alkoxy)thiamorpholino, piperazino, (lower alkyl)piperazino, di(lower alkyl)piperazino, hydroxy-lower alkylpiperazino, (phenyl-lower alkyl)piperazino, cinnamyl, hexamethyleneimino and homopiperazino, acid addition salts, and lower alkyl halide, lower alkyl sulfate, monocyclic aryl(lower alkyl)halide and monocyclic aryl(lower alkyl) sulfate quaternary ammonium salts of said bases.

2. A compound of the formula

[Structure: benzazocinone with CH₂–CH₂, CH–phenyl, N–C=O, lower alkylene-N(lower alkyl)(lower alkyl)]

3. 1 - (3 - dimethylaminopropyl)-3,4,5,6-tetrahydro-4-phenyl-1-benzazocin-2(1H)-one.
4. 1 - (2 - dimethylaminoethyl) - 3,4,5,6-tetrahydro-4-phenyl-1-benzazocin-2(1H)-one.
5. 1 - (3 - piperidinopropyl) - 3,4,5,6 - tetrahydro - 4-phenyl-1-benzazocin-2(1H)-one.
6. A compound of the formula

[Structure: benzazepinone with CH₂, CH₂, CH–phenyl, N–C=O, lower alkylene-N(lower alkyl)(lower alkyl)]

7. 1 - (2 - dimethylaminoethyl) - 4,5-dihydro-3-phenyl-1H-1-benzazepin-2(3H)-one.
8. A compound of the formula

[Structure: benzazepinone with CH₂, CH–phenyl, CH₂, N–C=O, lower alkylene-N(lower alkyl)(lower alkyl)]

9. 1 - (2 - dimethylaminoethyl) - 1,3,4,5-tetrahydro-4-phenyl-2H-1-benzazepin-2-one.
10. 1 - (3 - dimethylaminopropyl)-1,3,4,5-tetrahydro-4-phenyl-2H-1-benzazepin-2-one.
11. A compound of the formula

[Structure with $(CH_2)_m$, $(R_1)_p$, $(R)_p$, $(CH_2)_n$, N(H)–C=O]

wherein $m$ is a member of the group consisting of 1 and 2, $n$ is a member of the group consisting of 0 and 1, $p$ is a member of the group consisting of 1, 2 and 3 and R and $R_1$, each is a member of the group consisting of hydrogen, halogen, lower alkyl and lower alkoxy.

12. 3,4,5,6 - tetrahydro - 4-phenyl-1-benzazocin-2(H)-one.
13. 4,5-dihydro-3-phenyl-1H-1-benzazepin-2(3H)-one.
14. 1,3,4,5 - tetrahydro - 4-phenyl-2H-1-benzazepin-2-one.

15. A compound of the formula
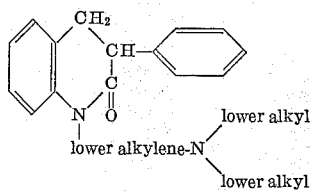
References Cited
UNITED STATES PATENTS
3,173,912  3/1965  Krapcho _____ 260—239.3
JOHN D. RANDOLPH, *Primary Examiner.*
WALTER A. MODANCE, *Examiner.*
ROBERT T. BOND, *Assistant Examiner.*